United States Patent
Štěpánek et al.

[11] 3,962,792
[45] June 15, 1976

[54] APPARATUS FOR MEASURING THE DIAMETER OF A WORKPIECE

[75] Inventors: Karel Štěpánek; Václav Rückl, both of Prague, Czechoslovakia

[73] Assignee: Vyzkumny ustav obrabechlich stroju a obrabeni, Prague, Czechoslovakia

[22] Filed: Apr. 3, 1974

[21] Appl. No.: 457,417

[30] Foreign Application Priority Data

Apr. 6, 1973 Czechoslovakia .................. 2471-73

[52] U.S. Cl. ............................. 33/143 L; 33/147 L; 33/174 L; 33/174 Q; 33/178 E
[51] Int. Cl.² ............................................ G01B 7/12
[58] Field of Search .......... 33/143 L, 147 L, 147 N, 33/174 Q, 174 L, 178 E, 148 R, 148 H, 143 R; 51/165 R, 165.91, 165.88, 165.83

[56] References Cited
UNITED STATES PATENTS

| | | | |
|---|---|---|---|
| 1,599,609 | 9/1926 | Damerell | 33/148 R |
| 3,802,087 | 4/1974 | Raiteri | 33/178 E |
| 3,851,396 | 12/1974 | Klabunde | 33/143 R |

Primary Examiner—Richard E. Aegerter
Assistant Examiner—Willis Little

[57] ABSTRACT

A variable range gauge follower apparatus for measuring the diameter of work pieces comprising a pair of pivotable arms each having a contact at one end adapted to engage the surface of the work piece. Each of the arms has fixed to it for conjoint movement a segment member having an angular position Inductosyn at its circumferential edge. Associated with each Inductosyn is a magnet sensing head stationarily fixed so as to be able to sense the induced current as a function of the angular displacement of the segment. Means are provided for phase measurement of the two signals which when compared with a predetermined starting signal determines the angular change of the arms and thus the diameter of the work piece. The two arms are each mounted in a shaft journaled in a frame-like body and are coupled for conjoint rotation by a pair of meshing gears to establish an initial spacing or opening between the two arms. The gears are provided with means for their uncoupling during actual operation.

7 Claims, 3 Drawing Figures

APPARATUS FOR MEASURING THE DIAMETER OF A WORKPIECE

BACKGROUND OF THE INVENTION

The present invention relates to apparatus for determining the size of a work piece and in particular to a following gauge type apparatus for following the surface of a workpiece to determine the precise grinding of the work piece on a machine tool such as a cylindrical grinder.

As it is well known it is most advantageous, during the grinding of a crank shaft, rod or the like, to continuously measure and monitor the work piece parameters so as to insure proper working and also to automatically control the continuing working cycle of the machine tool. Most of the known means for measuring or sizing the work pieces are constructed so as to have one member engaging the surface of the work piece and following its contour thereby gauging the size of the work piece by the deviation of the follower from a prescribed path. The known apparata are constructed so as to size work pieces only within a very narrow range from a predetermined set of parameters, as for example a deviance of only one mm. When work pieces are to be ground having varying diameter sections the sizing apparatus must be readjusted for each individual diameter section. Such an operation is time consuming and generally not easily accomplished. Another disadvantage with the known constructions arises when several work pieces each having varying diameters, are to be ground at one time or in one clamping of the work piece between predetermined centers. Under these conditions the known sizing apparata cannot be employed.

It is the object of the present invention to provide gauging apparatus for the measurement of work pieces of the type described which obviate and overcome all the disadvantages of the known equipment.

It is another object of the present invention to provide apparatus of the type described having a wide gauging range and being versatile to gauge varying diameter work pieces or several work pieces of different diameter.

It is another object of the present invention to provide apparatus of the type described capable of being quickly and easily adjustable for varying diameter sizes.

It is a further object of the present invention to provide apparatus of the type described capable of gauging the diameter of the work piece with respect to a predetermined standard work piece or with respect to a predetermined set of parameters.

These objects, other objects and numerous advantages of the present invention will be apparent from the following disclosure of its preferred embodiment.

SUMMARY OF THE INVENTION

According to the present invention apparatus for measuring and sizing work pieces of the following gauge type is provided comprising a pair of pivotable arms each having a sizing contact at one end adapted to engage the surface of the work piece and each having fixed for conjoint movement with it, a segment member having an angular Inductosyn secured at the circumferential edge. Associated with each of the Inductosyns is a magnet sensing head fixedly secured so as to sense the induced current produced by the Inductosyn as a function of the angular displacement of the segment member.

The two arms are each mounted on a shaft, journaled in a frame-like body, to rotate about axes parallel to the axis of the work piece and are coupled for conjoint rotation by a meshing gear mounted on each of the shafts. The gears enable the simultaneous movement of the arms in order to establish an initial distance or space or opening between the two arms such an opening is used as the standard or reference from which any deviation may be measured and may in fact be equivalent to a standard or predetermined sized work piece. The apparatus includes means for shifting one of the coupling gears so that a clearance between them can be established during the actual setting of the arms prior to the measuring operation in a standard spacing. By allowing the gears to be movable in the opposite direction the arms are permitted to move freely with respect to each otherr during the actual gauging of the work piece and this can determine a size deviant from the standard.

The advantage of the present apparatus is that the device is constructed having two contact following gauges in engagement with the surface of the work piece. The following gauges have a "floating" performance each being freely movable in response to the variance in the work piece and being angularly rotatable or pivotable about their axes with respect to each other. As a result, a high degree of accuracy within a very wide range of movements, for example from 20 to 140 mm. the angular movement of the arms is translated directly into the angular movement of the Inductosyns which is directly sensed by the magnet head. The following gauge of the present invention works upon the principle of the phase measuring of the two signals provided by the two inductosyns, the position of which is dependent directly upon the position of the following sensing contacts in engagement with the work piece.

Further in accordance with the present invention the gauge apparatus is provided with an electronic control system employing selsyn resolvers which function as phasing elements through which the movement of the arms can be compared to a given reference or standard and which are capable of reading out the angular positions of the work piece sensors. The selsyns may also be employed to adjust the position of the arms of the gauge on initiation of successive cycles for sizing and measuring successive work pieces, based upon the individual ground diameter of the work piece initially or made in a preceding cycle.

Full details of the present invention is exemplified and shown in the accompanying drawings and is described in full in the following description.

DESCRIPTION OF THE INVENTION

Figure 1:
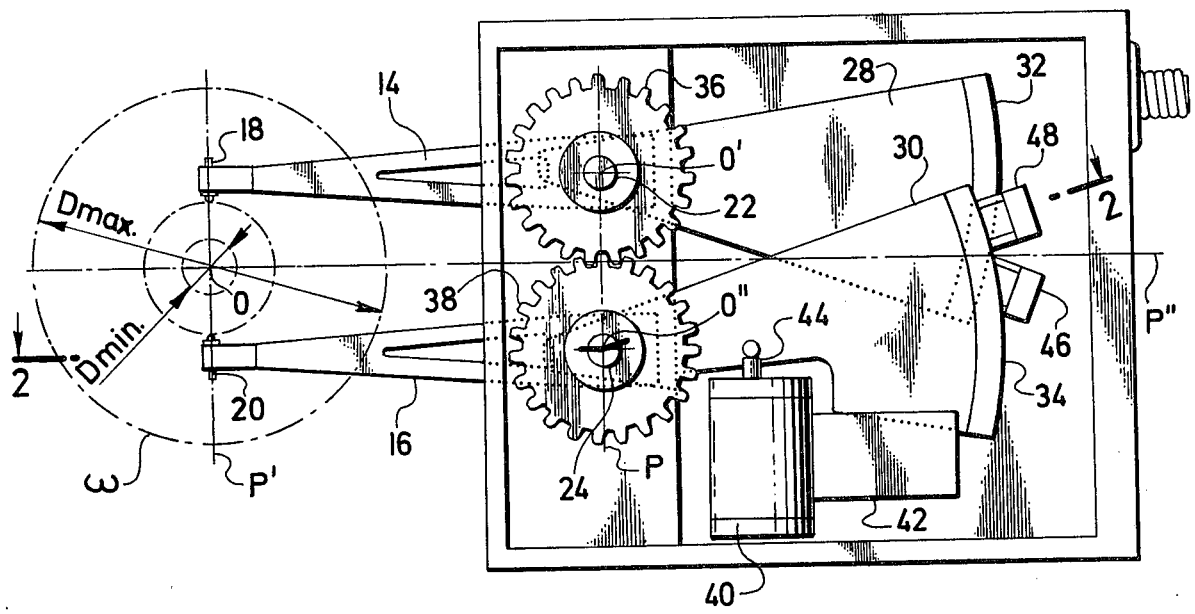
FIG. 1 is a front view of the gauging apparatus embodying the present invention as applied in use.
Figure 2:
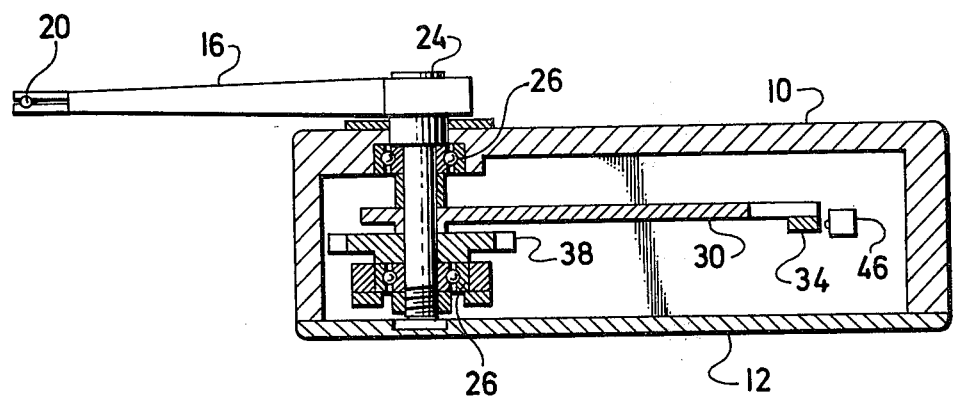
FIG. 2 is a sectional view of the apparatus of FIG. 1 taken along line 2—2.

As seen in FIGS. 1 and 2, the apparatus of the present invention is adapted to sense the diameter of a rotating work piece W such as a crank shaft, motor shaft, or the like during its manufacture. The work piece W is mounted on a conventional machine tool such as a cylindrical grinder and is rotated about its longitudinal axis O while it is being worked. Since the machine tool and its operation is conventional and is well known to those skilled in the art it is not believed necessary to shown its detail herein and the same is omitted.

According to the present invention a housing having a box-like body 10 and a lid 12 is provided. The housing is adapted to be mounted on a movable carriage or table on the machine tool or on a fixed support adjacent the machine tool so that it may be placed in operative position along the length of the work piece. Extending on the exterior of the housing body 10 toward the work piece W are a pair of spaced arms 14 and 16, art the extreme outer ends of which are located a pair of follower contacts 18 and 20. The contacts 18 and 20 have surfaces adapted to slidably engage the work piece and are preferably mounted within the ends of the arms 14 and 16 so as to be adjustable and removable from the arms. To effect this the arms may be split at their outer ends to form a fork-like receiving journal for the contact and a clamp, bolt or other fastener can be used to fix the contact in place.

The arms 14 and 16 are fixed at their other or inner ends to shafts 22 and 24 respectively which extend into the housing body 10 and are precisely journaled for rotation about axes O' and O'' in a pair of spaced radial bearings 26. The bearings 26 are fixed in suitable bosses or supports in the wall of the body and are aligned so that the axes O' and O'' lie in a common plane P parallel to the longitudinal axis O of the work piece W. Fixed to the respective shafts 22 and 24 within the housing body 10 are flat plate-like segment members 28 and 30 each having means for producing a magnetic field varying in intensity along its length (such as an Inductosyn) 32 and 34 secured along the lower faces adjacent their circumferential edge. Also fixed coaxially to the respective shafts 22 and 24 are circular gears 36 and 38 which normally mesh with each other. In this meshing condition the arms 14 and 16 are coupled together in such a manner that the movement of one arm about its pivot axis will cause a similar movement in the opposite direction of the other arm about its respective pivot axis. The arms 14 and 16 are thus coupled together so that they float simultaneously about their pivot axis in response to changes in the diameter of the work piece, within the range of the two gears 36 and 38. The arms 14 and 16 may however be spaced from each other or opened by a predetermined minimum amount. This opening of the arms 14 and 16 is effected by a lifting element 40 driven by a motor 42. The motor 42 can be controlled automatically from an electronic control system of the bype described in connection with FIG. 3 or in some other manner as well as by manual manipulation. The lifting element 40 has an extending member such as a piston 44 which is adapted to engage the one segment 30 causing it to rotate the shaft 24 about its axis thereby rotating the gear 38. As the gear 38 rotates the arm 16 is swung about its pivot axis O'' and simultaneously by meshing of the gear 36 causes the arm 14 to swing in an opposite direction about its axis O''. As seen in FIG. 1 the lifting element 40 produces a lifting movement on the segment 30 although the same was more easily characterized as an angular displacement about the axis O''. It will be seen that the arms 14 and 16 are thus movable apart relative to each other in the manner of a caliper.

Each of the Inductosyns is supplied with two signals, i.e. electric currents, shifted out of phase mutually with respect to each other by 90° (more clearly described in connection with FIG. 3). Inductosyn, a trademark of the Inductosyn Corporation, Valhalla, N.Y., is an analog position transducer having multi phase coil windings capable of producing a magnetic field variable along its length by the passage of a current therethrough. Such device, produced by the Farrand Controls, Inc. comprises a conductor deposited on glass and is operated at relatively high frequency. On the other hand a coil or similar inductance conductor may be used. As such the Inductosyn produces a magnetic field along its length which varies in intensity. Mounted adjacent each of the Inductosyns 32 and 34 respectively is a magnetic sensing head 46 and 48 which is capable of sensing the magnetic field induced by the Inductosyns. The heads 46 and 48 are arranged so as to be positioned at one end of the arcuate circumferential end of the segment member 28 and 30 when the arms are positioned closest to each other. In this position they then are adjacent the initial or beginning end of the inductance member and are capable of sensing the entire length of the inductance member when the arms 14 and 16 are swung outwardly from each other. The magnet heads serve to sense the signal phase shift produced by the Inductosyns in dependence upon the position of the Inductosyns which is also directly dependent upon the position of the arms 14 and 16. The evaluation of the signals are phase made in the electronic system shown in FIG. 3. As seen in FIG. 1 the pivot axes O' and O'' about which the arms 14 and 16 pivot, lie in the common plane P parallel to the axis O of the work piece. The length of the arms is chosen and the position at which the follower contacts 18 and 20 are secured is chosen so that preferably the contacts lie on a plane P' passing through the axis of rotation of the work piece which is parallel to the plane P when the arms 14 and 16 are also parallel to each other. It will also be noted from FIG. 1 that in the preferred arrangement the arms 14 and 16 as well as their mounting shafts 22 and 24, and the magnetic sensing heads 46 and 48 lie symmetrical about a plane P'' which is perpendicular to the plane P and which passes through the center of the axis of rotation O of the work piece. This arrangement and its parameters may be preferable as establishing a standard base arrangement, however they need not be taken as critical.

Mechanically, as seen in FIG. 2 the shaft 24, holding arm 16, is held in position against axial and radial movement by a nut threaded at its lower end compressing against the space bearings, the segment member and gear held thereon. The segment member and gears may be provided with suitable keyways while the shaft is conformingly keyed to obtain conjoint rotational movement. The apparatus may also be provided with terminal switches for reading out the position of the arms. Also the magnetic heads 46 and 48 are each provided with a preamplifier serving to amplify the signals induced upon the magnetic heads by the Inductosyns.

Figure 3:
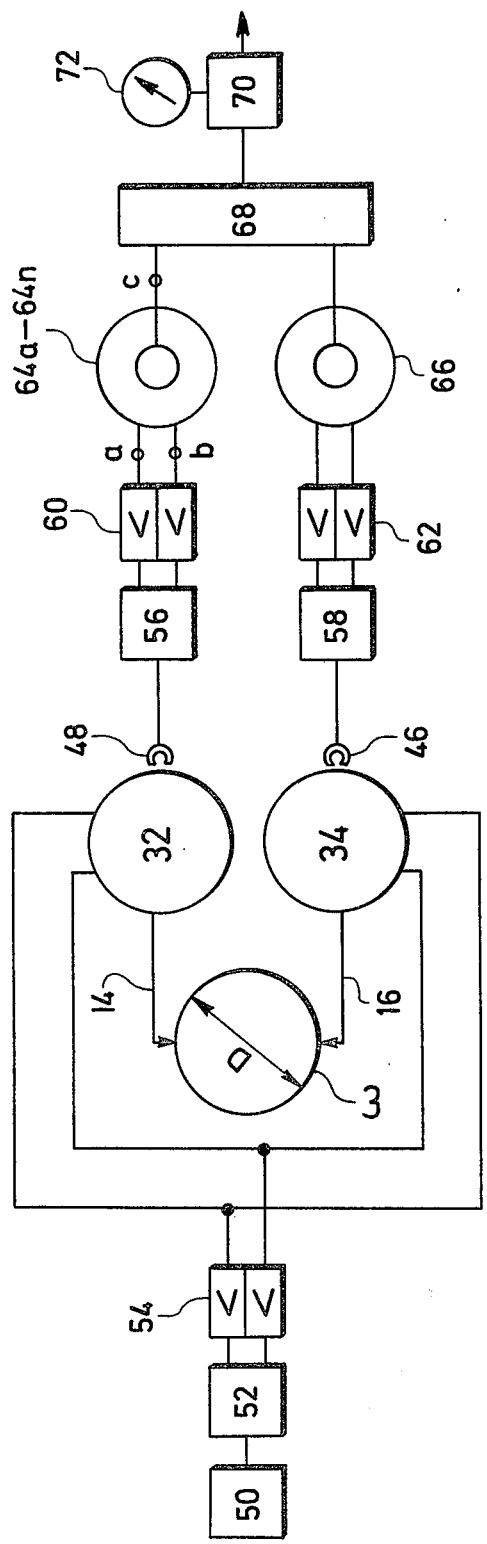
FIG. 3 is a schematic diagram of the electronic control system employed with the present invention.

Turning to FIG. 3 the electronic control systememployed in the present invention comprises an oscillator 50 which provides an alternating electric current of a predetermined frequency as for example 100 kHz. The alternating current signal is fed to a divider 52 where the signal is split four times so that a two-phase signal of a frequency of 25 kHz is created. Each two-phase signal is supplied to the Inductosyns 32 and 34 via an intermediate amplifier 54. The position of the Inductosyns relative to the magnetic heads 46 and 48 respectively, vary, as indicated earlier, directy with the movement of the arms 14 and 16 which of course depend upon the diameter D of the work piece. The inductosyns thus produce an inductance field which is sensed by the magnetic head of a varying strength which is directly dependent upon the diameter of the work piece. The signals from the Inductosyns are sensed by the magnetic heads which pass them on individually to a pair of biphasers 56 and 58 respectively where the signals are changed into the two-phase signals having the same frequency. These two-phase signals are led from the biphasers 56 and 58 to a pair of amplifiers 60 and 62 respectively. The amplified signals from one of the Inductosyn systems, namely the signal derived from the amplifier 60 is passed to the stators (sweep generators) of a plurality of selsyn units 64a through 64n. The signal derived from the other Inductosyn system, namely the signal from the amplifier 62 is fed onto the stator (sweep generator) of a single selsyn unit 66. The selsyn units are conventional synchro motor-like devices containing both stator and rotor capable of transforming an electrical input into an angular output or an angular input to an electrical output. The selsyn, a name derived from the unit initially made by the General Electric Company of the United States is now aplied generically to synchro units. The output from the rotors of each of the selsyn units 64a through 64n and 66 are fed to a phase meter 68 where they may be compared, integrated, read out and otherwise operated upon. The output of the phase meter 68 is led to the control apparatus 70 and to a read out meter 72. The control mechanism 70 may produce a signal or signals which can be read into the control system for the machine tool by which this machine tool may be provided with information concerning the sizing, measurement, diameter and other factors involved in the work piece whereby the machine tool itself may be controlled during the cycle underway or for succeeding cycles.

It will be seen that the above described construction of the gauging apparatus according to the present invention enables the work piece to be constantly measured and sized by means of a following gauge operative over a very wide range. Accordingly the following gauge can measure without any readjustment work pieces causing an angular displacement in the arms 14 and 16 within the entire range of the Inductosyn arcuate circumferential edge. That is the arms may swing and a signal will be derived along the entire edge of the inductosyns 32 and 34. The measuring is continuous, consequently within the range of zero through 360° phase shifting of the signals from the magnetic heads 46 and 48. This range has been chosen to correspond with a relative deviation of the contacts 18 and 20 or with the change of a work piece of 20 mm. From the phase principle of the measuring technique it follows that the measuring range of the gauge has a multi-meaning character and is repeated after each 2

The entire control process and system for operating the machine tool is therefore based upon a repeating principle wherein a standard or reference base is made during an initial grinding operation and this base is retained or memorized whereby the same may be repeated with subsequent grinding operations. This means that on the beginning of the measurement process it is necessary to grind the workpiece by hand to the required diameter. As a result a given signal is obtained through the control system of FIG. 3 via the selsyns 64a through 64n and 66. This signal is adjusted in the selsyns 64a through 64n so that a null or zero value is obtained on the dial point 72. Thus the hand ground work piece, to the required diameter, is caused to provide a null or base signal, equal to zero, on the point 72. The selsyns 64a through 64n then serve as a "memory" for the given diameter during the subsequent grinding of other work pieces. This enables the grinding of the subsequent work pieces to be carried out automatically by a control from the control mechanism 70 operating on the machine tool. The selsyn 66 serves as a base or comparative signal for the other selsyns thereby determining both arms of the angular displacement.

A plurality of selsyn units 64a through 64n have been shown. It is obvious that only one of such selsyns is needed to determine any specific diameter. The plurality of selsyns is provided however in order to enable the present apparatus to have a versatility in being able to gauge and size different diameters, and different work pieces. A plurality of switches a, b and c are interposed between the amplifier 60 and the selsyns 64 and the selsyns 64 and the phase meter 68. These switches enable the selection of one selsyn for any given or predetermined diameter. For example, it has been found that it is possible to grind work pieces having eight various diameters by the use of eight selsyns 64. Each selsyn being selectively interposed in the system for each particular diameter desired. The selsyn member 66 connected with the other Inductosyn system is employed to establish a correct base or angular reference for each of the other selsyn units.

After each of the diameters are predetermined and the selsyn units are set so that the meter readout 72 is zero, the contacts 18 and 20 when placed upon the work piece, produce via the Inductosyn systems a signal differing from the value (zero) set previously, i.e. when grinding of the first work piece took place. This difference is of course indicative of the difference of the diameter from the predetermined required diameter of the work piece and is in effect the grinding allowance. Should this grinding allowance be smaller than 2 mm. it is assumed that the measuring apparatus and system described is working within the same phase range as when the initial or first work piece had been ground. This means that the grinding of the diameter by 2 mm. more or less than the initial or standard work piece, could never take place due to the multi-meaning character of the system.

The gauge apparatus according to the present invention is preferably mounted on a cross-table or carriage enabling it to be fed to the work piece without interfering with the loading operation of the work piece. Mounting the gauge upon the movable carriage further enables its longitudinal displacement along the length of the work piece. Preferably this displacement is made at three selected positions, the center of the work piece and at each end of the work piece. In this manner gauging the work piece can be measured at both the center and end parts of the grinding wheel.

The measuring apparatus according to the present invention can be used as a very accurate following gauge of the surface diameter of the work piece enabling its quick adjustment for given diameters, by means of the ability to zero set the phase of a plurality of selsyns and enables the grinding of a work piece or several work pieces having different diameters (for example eight different diameters, at one clamping of the work piece).

What is claimed is:

1. Apparatus for measuring the diameter of a work piece comprising a pair of extending arms, each of said arms being mounted at one end on a shaft rotatable about an axis parallel to the longitudinal axis of the work piece and having a contact mounted at its other end for engagement with said work piece, coupling means for causing each of said respective arms and associated shafts to simultaneously move with respect to each other about the axis of the respective shafts in response to the engagement of said contact with said work piece, a segment member connected to each of said arms for conjoint movement therewith having a circumferential edge coaxial with the axis of rotation, each of said segments having means for producing a magnetic field variable along the length of its circumferential edge, and a pair of magnetic sensing heads respectively spaced from each of said circumferential edges at a given point to sense the respective magnetic fields at said given point and means for evaluating each of said fields and for determining the angular relationship between said segments and between said arms.

2. The apparatus according to claim 1 including means for adjusting said coupling means to preset said arms at a predetermined distance relative to each other.

3. The apparatus according to claim 2 wherein said coupling means comprises a gear mounted coaxially on eachshaft and intermeshing with each other.

4. The apparatus according to claim 1 wherein said means for producing said magnetic field along the circumferential edge of said respective segments comprises a conductor and means for impressing thereon a polyphase current producing a polyphase magnetic field, and said means for evaluating said respective fields include means for sensing the phase shift within said fields.

5. The apparatus according to claim 4 wherein siad means for evaluating said shift in phase includes a selsyn connected to the output of each of said magnetic sensing heads for producing a signal indicative of the phase thereof.

6. The apparatus according to claim 3 including a plurality of selsyns and a plurality of switch means interposed between said magnetic sensing heads and said plurality of selsyns for selectively connecting one of said selsyns to said magnetic head.

7. The apparatus according to claim 3 including means for comparing the phase output of said magnetic heads.

* * * * *